United States Patent
Li et al.

(10) Patent No.: US 7,184,500 B2
(45) Date of Patent: Feb. 27, 2007

(54) METHOD AND SYSTEM FOR ADAPTIVELY COMBINING SIGNALS

(75) Inventors: Yingxue Li, Bethlehem, PA (US); Haim Harel, New York, NY (US)

(73) Assignee: Magnolia Broadband Inc., Bedminster, NJ (US)

( * ) Notice: Subject to any disclaimer, the term of this patent is extended or adjusted under 35 U.S.C. 154(b) by 757 days.

(21) Appl. No.: 10/334,205

(22) Filed: Dec. 30, 2002

(65) Prior Publication Data

US 2004/0125899 A1    Jul. 1, 2004

(51) Int. Cl.
*H04B 7/10* (2006.01)
*H04L 1/02* (2006.01)

(52) U.S. Cl. .................. 375/347; 375/346; 375/316; 375/371; 375/227; 455/522

(58) Field of Classification Search .............. 375/347, 375/346, 316, 371, 227; 455/522
See application file for complete search history.

(56) References Cited

U.S. PATENT DOCUMENTS

| | | | | |
|---|---|---|---|---|
| 4,152,702 A | * | 5/1979 | Piesinger | 342/367 |
| 4,217,586 A | * | 8/1980 | McGuffin | 342/380 |
| 5,132,988 A | * | 7/1992 | Fisher et al. | 375/233 |
| 6,185,266 B1 | * | 2/2001 | Kuchi et al. | 375/347 |
| 6,865,377 B1 | * | 3/2005 | Lindskog et al. | 455/101 |

FOREIGN PATENT DOCUMENTS

| | | |
|---|---|---|
| EP | 1 255 369 A1 | 11/2002 |
| WO | WO 03/005606 A1 | 1/2003 |
| WO | WO 03/073648 A1 | 9/2003 |

OTHER PUBLICATIONS

Biedka et al., "Smart Antenna for Handsets," Bradley Department of Electrical and Computer Engineering, Virginia Polytechnic Institute and State University, Blacksburg, VA 24061-0111, 5 pages, Aug. 2, 2000.

(Continued)

*Primary Examiner*—Chieh M. Fan
*Assistant Examiner*—Anna Ziskind
(74) *Attorney, Agent, or Firm*—Pearl Cohen Zedek Latzer, LLP

(57) ABSTRACT

Combining signals includes receiving a plurality of groups of signals at a plurality of antennas at a mobile device, where each group of signals includes a plurality of signals, and each signal includes a time slot. The following is repeated for each group of signals of the plurality of groups of signals. An adjustment associated with a time slot of each signal is set. Each signal of the group of signals is adjusted at the time slot in accordance with the adjustment associated with the time slot. A signal quality associated with each time slot of each signal of the group of signals is established, and an optimal adjustment in accordance with the signal qualities is determined. The signals are adjusted in accordance with the optimal adjustment.

1 Claim, 4 Drawing Sheets

OTHER PUBLICATIONS

Subscriber-Based Smart Antennas, CDG Digevent, Presented by Jim Proctor, Director of Technical & Strategic Marketing, Tantivy Communications, Inc., 17 pages, Nov. 14, 2001.

Babak Daneshrad, "Mobile Terminal Smart Antenna Technology for CDMA Networks," InnovICs, 20 pages, Broadcast on web Nov. 14, 2001.

Ohira, T., "*Analog Smart Antennas: An Overview*," IEEE, 0-7803-7589-0/02, PIMRC 2002,© 2002 IEEE, pp. 1502-1506, XP010611516, Sep. 15, 2002.

PCT, Notification of Transmittal of The International Search Report or the Declaration, International Application No. PCT/US03/40485, 6 pages, May 24, 2004.

* cited by examiner

METHOD AND SYSTEM FOR ADAPTIVELY COMBINING SIGNALS

BACKGROUND OF THE INVENTION

In a point-to-multipoint communication system, a diversity antenna system of a mobile device receives signals transmitted from a base station. Such signals may be affected by multipath effects and interference, resulting in signal degradation and reduced efficiency. Known techniques for improving signal reception through diversity antenna systems involve using multiple receiver coupled to multiple antennas. The signals are digitally combined to improve the reliability of communication systems. These techniques, however, require duplication of Radio Frequency (RF) chains and baseband processing that result in an increase of required space, required power consumption, and unit cost. These increases may be challenging for mobile device optimization because mobile device optimization generally requires smaller space, lower power consumption, and lower cost. Consequently, known techniques for combining signals are unsatisfactory in certain situations.

SUMMARY OF THE INVENTION

In accordance with the present invention, disadvantages and problems associated with previous techniques for combining signals may be reduced or eliminated.

According to one embodiment of the present invention, combining signals includes receiving a plurality of groups of signals at a plurality of antennas at a mobile device, where each group of signals includes a plurality of signals, and each signal includes a time slot. The following is repeated for each group of signals of the plurality of groups of signals. An adjustment associated with a time slot of each signal is set. Each signal of the group of signals is adjusted at the time slot in accordance with the adjustment associated with the time slot. A signal quality associated with each time slot of each signal of the group of signals is established, and an optimal adjustment in accordance with the signal qualities is determined. The signals are adjusted in accordance with the optimal adjustment.

Certain embodiments of the invention may provide one or more technical advantages. A technical advantage of one embodiment may be that by adjusting the incoming signals in response to signal quality estimates, the signal reception may be improved. The adjustment may be performed by analog or digital signal processing. Another technical advantage of one embodiment may be that adjusting and combining incoming signals reduces the number of signals to be processed, resulting in a reduction of signal processing resources while maintaining diversity gain.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
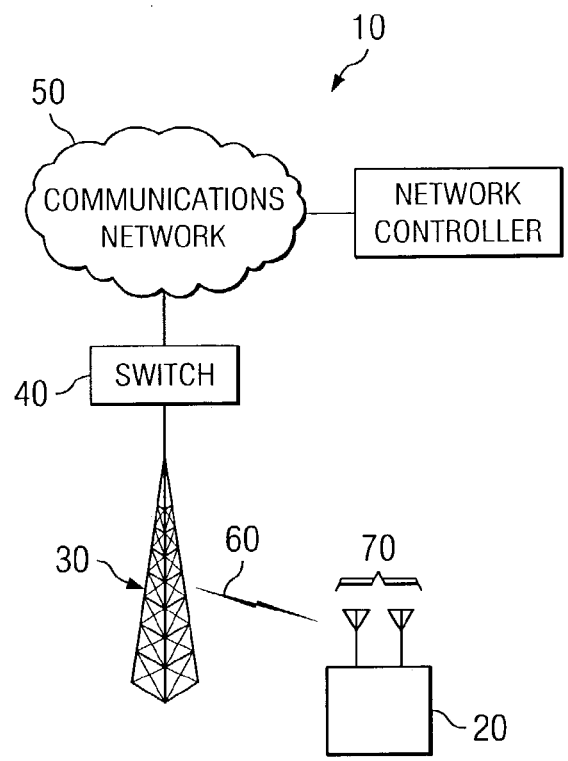
FIG. 1 is a block diagram illustrating an embodiment of a system including a mobile device with a diversity combining system.

FIG. 1 is a block diagram illustrating an embodiment of a system 10 including a mobile device 20 with a diversity combining system. In general, the mobile device 20 includes a mobile antenna system 70 that receives signals 60 that are intended for a subscriber of system 10. Mobile device 20 adjusts and combines the signals 60 according to signal quality estimations in order to improve reception.

According to the illustrated example, system 10 includes a communications network 50, a switch 40, a base station 30, and a mobile device 20. The base station 30 transmits the signal 60 associated with the base station coverage area as dictated by the switch 40 and the communications network 50. Mobile device 20 receives the signal 60 at the mobile antenna system 70. The mobile antenna system 70 is capable of receiving any number of incoming signal, which may include various components of the signal 60 transmitted by the base station 30. These incoming signals are adjusted according to signal quality estimations. The adjustments may be performed by adjusting the phase, the amplitude, or both. The signals 60 are combined and processed by a receiver in order to use the baseband signal carrying the communication intended for the subscriber.

One embodiment of the diversity combining system is described in more detail with reference to FIG. 2. One embodiment of a vector modulator used in the diversity combining system is described with reference to FIG. 3A. Another embodiment of a vector modulator used in the diversity combining system is described with reference to FIG. 3B. A method for adjusting signals in the diversity combining system is described with reference to FIG. 4. A method for adjusting signals according to phase rotation is described with reference to FIG. 5. A method for adjusting a signal according to a power ratio is described with reference to FIG. 6. In referring to any description, "each" refers to each member of a set or each member of a subset of the set.

Figure 2:
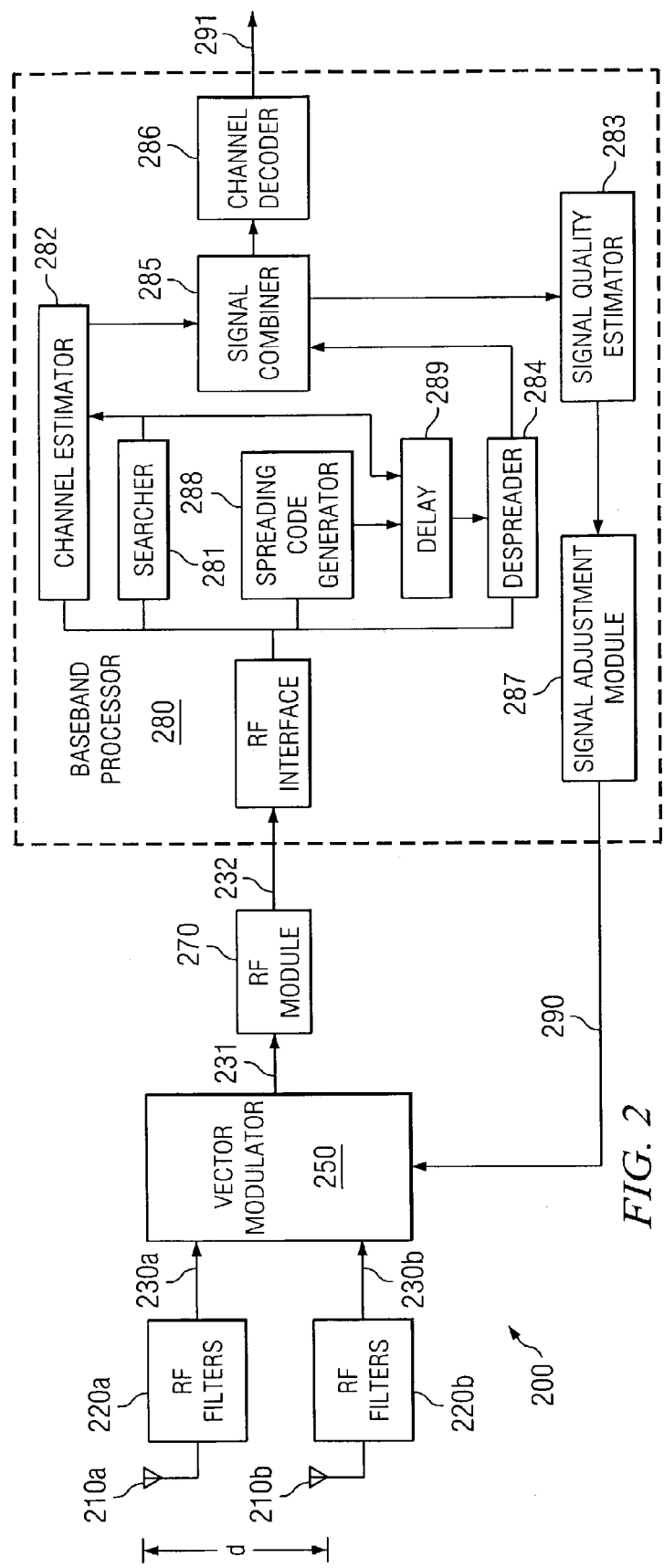
FIG. 2 is a block diagram illustrating an embodiment of a diversity combining system of the mobile device of FIG. 1.

FIG. 2 is a block diagram illustrating an embodiment of a diversity combining system 200 of mobile device 20 of FIG. 1. In general, a number of antennas 210 at mobile device 20 receive a signal 60, resulting in a number of incoming signals that are processed by the diversity combining system 200. A vector modulator 250 adjusts the incoming signals by applying signal adjustments 290 calculated by a signal adjustment module 287 at baseband processor 280. The adjustments 290 modify the incoming signals changing the phase, the amplitude, or both phase and amplitude of the signals. The signal adjustment module 287 manages the signal combining in response to the quality of the signals. Diversity combining system 200 is capable of processing a number of incoming signals by adjusting their phase, their amplitude, or both, such that a mobile device 20 may be able to receive signal 60 more efficiently, which may improve signal reception.

According to the illustrated embodiment, diversity combining system 200 includes antennas 210, radio frequency (RF) filters 220, vector modulator 250, RF module 270, and baseband processor 280. The signal 60 depicted at FIG. 1 is received by mobile device 20 through antennas 210. Antennas 210 may comprise any suitable number of antennas. In the illustrated embodiment, antennas 210 comprise antennas 210a and 210b. Antennas 210a and 210b may comprise any suitable antenna, for example, wipe antennas, stubby antennas, patch antennas, and magnetic antennas. Antennas 210a and 210b are separated by a distance d. Distance d may be defined as any separation that allows the antennas 210 to operate in the intended frequency band. According to the illustrated embodiment, distance d may be in a range between 0.1 to 1.0 wavelength, for example, approximately 0.13λ to allow for operation in either the 800 MHz or the 1.9 GHz band.

Radio frequency (RF) filters 220 filter the received signals. In the illustrated embodiment, the signal received by antenna 210a is filtered by RF filters 220a, and the signal received by antenna 210b is filtered by RF filters 220b. According to one embodiment, RF filters 220 comprise duplexors and diplexors. In general, a duplexor comprises a filter that filters signals according to frequency separation of the transmit and receive frequencies, which allows a transmitter and receiver to use the same antenna. A diplexor may comprise a switch, a filter, or any suitable device for separating signal frequencies according to different frequency bands. For example, frequency bands that may be diplexed are the 800 MHz band and the 1.9 GHz band. Such diplexor operation may be useful for mobile devices 20 capable of operating in dual band systems.

According to one embodiment, a signal received at antenna 210a is filtered by a duplexor configured to filter receive frequencies. A diplexor separates the signal to obtain a particular frequency band at which the mobile device 20 operates. A signal received at antenna 210b is filtered in a similar manner. RF filters 220a output a filtered signal 230a, and RF filters 220b output a filtered signal 230b. Other filters may be used as RF filters 220 without deviating from the scope of the invention. Any suitable number of antennas may be used in combination with any number of RF filters to produce any suitable number of desired filtered signals for processing by the diversity combining system 200.

Vector modulator 250 adjusts filtered signals 230 and combines the adjusted filtered signals to output a combined receive signal 231. In general, vector modulator 250 combines input signals comprising any number of filtered signals 230 so that the output comprises a reduced number of output signals. According to the illustrated embodiment, vector modulator 250 receives filtered signals 230a and 230b and outputs one combined receive signal 231, resulting in reduction of digital processing. According to an example of an embodiment, at least one of the filtered signals 230 may be phase rotated in response to signal adjustments 290 before being summed into combined receive signal 231. According to another embodiment, the amplitude and phase of at least one of the filtered signals 230 may be adjusted before being summed into combined receive signal 231. Vector modulator 250 may be located anywhere in the receiving chain of diversity combining system 200, for example, vector modulator 250 may be located before RF filters 220 without departing from the scope of the invention. Vector modulator 250 may receive any suitable signal for combining and adjusting. For example, vector modulator 250 may adjust and combine received signals before being filtered by RF filters 220.

Vector modulator 250 may receive signal adjustments 290 that provide instructions for adjusting the signals, which are described in more detail with reference to FIGS. 4, 5, and 6. The operation of vector modulator 250 is described in more detail with reference to FIG. 3.

RF module 270 includes a receive section that receives combined receive signal 231 and downconverts the frequency from an RF frequency band to baseband frequency band to yield a baseband signal 232. RF module 270 sends the baseband signal 232 to the baseband processor 280 for processing. It is understood that an RF frequency band may include any frequency band within in the range of mobile and fixed wireless communications, such as the 800 MHz band, 1.9 GHz band, and any other suitable frequency band suitable for operating as a carrier in a communication system 10.

The baseband processor 280 of the diversity combining system 200 receives and processes baseband signal 232 to yield a decoded information bit 291 and signal adjustments 290. Baseband processor 280 comprises a searcher 281, a channel estimator 282, a signal quality estimator 283, a despreader 284, a signal combiner 285, a channel decoder 286, a spreading code generator 288, a delay unit 289 and a signal adjustment module 287. The searcher 281 may comprise a search engine operable to search possible signal clusters. According to the illustrated embodiment, searcher 281 searches for signal clusters with an arrival time of more than 1 chip duration. Searcher 281 may search signal clusters with any difference of arrival times between signal clusters without departing from the scope of the invention.

Delay unit 289 receives the output of searcher 281 for processing the delay associated with the signal clusters. According to the illustrated embodiment, a signal cluster may be described as a path of signals. Any number of path of signals may be processed by delay unit 289. Delay unit 289 may include any number of delay units such that delay unit 289 may process delay of any number of paths of signals.

Despreader 284 receives delay information from delay unit 289 and searcher 281 and performs despreading of the baseband signal 232 into symbol level signals. Despreader 284 may include correlators that receive the delay associated with the path of signals from delay unit 289 so that each correlator may output a symbol level signal. Despreader 284 may comprise any number of correlators without departing from the scope of the invention. According to the illustrated embodiment, despreader 284 comprises, for example, three correlators, each correlator being operable to process path of signals from delay unit 289. The symbol level signals may be associated a path of signals. According to the illustrated embodiment, delay unit 289 processes three delay components that are received by three correlators at despreader 284 to output three symbol level signals, each symbol level signal containing signal information for the path of signals.

Channel estimator 282 receives delay information of each path from searcher 281 to estimate a complex channel response associated with each path. Signal combiner 285 is operable to combine the symbol level signals received from the despreader 284. In general, these signals may be combined coherently based on maximal ratio combining, to produce maximum signal-to-noise ratio, carrier to interference ratio, or any suitable signal quality measure. The output signals from signal combiner 285 may be fed into the decoder 286 for decoding to generate a decoded information bit 291.

Signal quality estimator 283 provides information about the signal quality for the received signal. According to one embodiment, the signal quality estimator 283 uses the combined signal from signal combiner 285 to estimate the signal-to-noise ratio of the received signals. Signal quality estimator 283 may estimate any suitable signal quality measure without departing from the scope of the invention.

Signal adjustment module 287 is operable to receive signal quality information from signal quality estimator 283 to determine signal adjustments 290. Signal adjustment module 287 sends signal adjustments 290 to vector modulator 250. Vector modulator 250 adjusts filtered signals 230 and combines the adjusted filtered signals according to the signal adjustments 290. According to one embodiment, signal adjustments 290 include phase tuning instructions. According to yet another embodiment, signal adjustments 290 may include power ratio instructions in addition to phase tuning instructions.

In summary, diversity combining system 200 receives multiple signals through antennas 210. The signals are filtered by RF filters 220, adjusted by vector modulator 250, and combined by vector modulator 250 according to signal adjustments 290. The combined signals are processed by the baseband processor 280, where a signal quality estimator 283 determines the signal quality of the received signals. A signal adjustment module 287 determines the adjustments to be performed by vector modulator 250. The operations of diversity combining system 200 may be performed using hardware, software, or any combination or arrangement of processors or modules suitable for adaptively combining diversity signals as disclosed.

Various modifications, additions, or omissions may be made to diversity combining system 200 without departing from the scope of the invention. For example, baseband processor 280 may include additional logic to process signals according to a wireless protocol used by system 10. As another example, vector modulator 250 may be modified to include an antenna combiner or any element suitable for summing analog signals. As yet another example, vector modulator 250 may located anywhere in diversity combining system 200 to adjust and combine RF signals, baseband signals, filtered signals, or any suitable signal of diversity combining system 200.

Figure 3A:
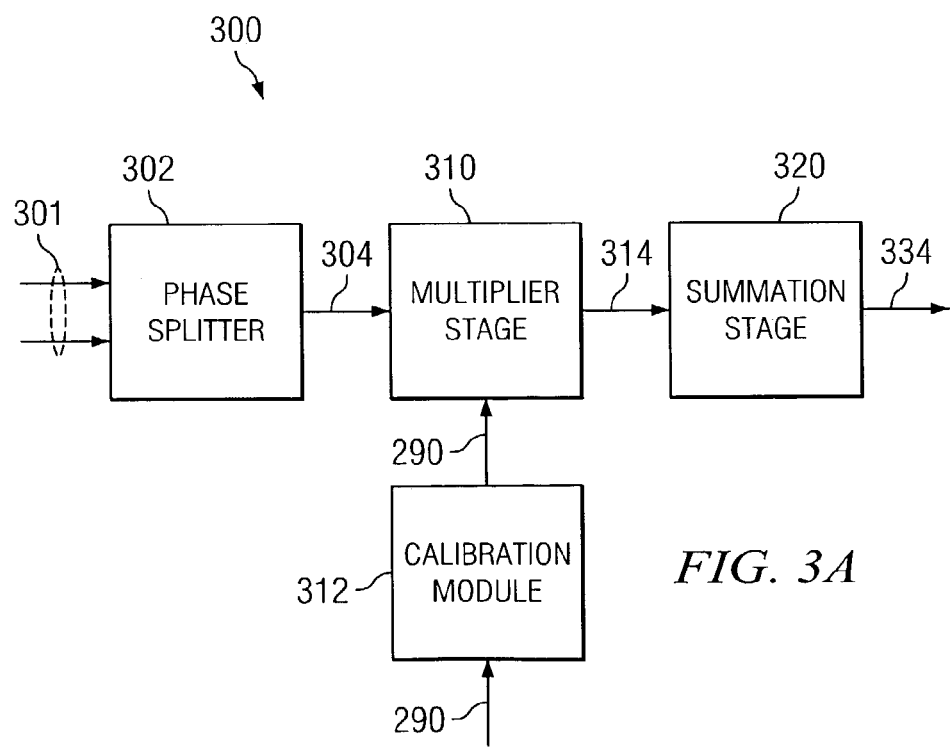
FIGS. 3A and 3B are block diagrams illustrating embodiments of vector modulators of the diversity combining system of FIG. 2.
Figure 3B:
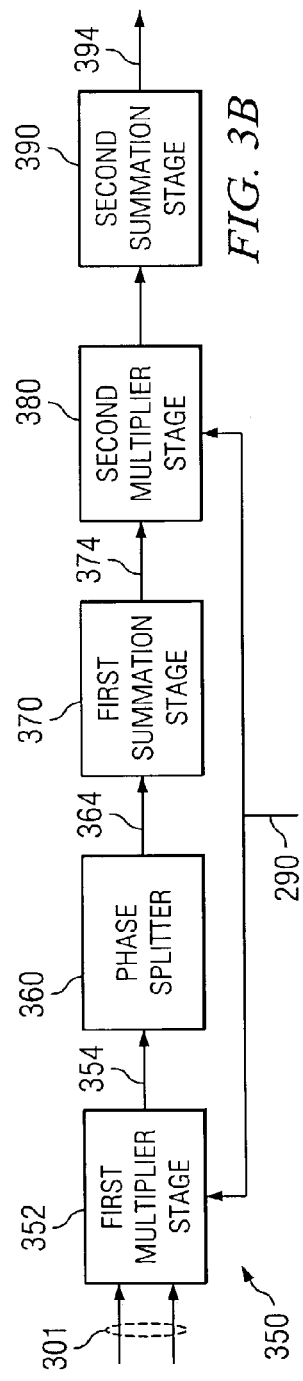

FIGS. 3A and 3B are block diagrams illustrating embodiments of vector modulators 300 and 350 used in a diversity combining system of FIG. 2. In general, vector modulators receive signals and separate their components into in-phase and quadrature components. The components are adjusted in accordance with signal adjustments 290, which may improve signal combining. A vector modulator may adjust an incoming signal so that the in-phase I and quadrature Q of the adjusted signal maintain the total incoming signal energy $I^2+Q^2$. According to one embodiment, filtered signals 230 may be multiplied by the signal adjustments 290 such that the total energy $I^2+Q^2$ remains constant.

According to one embodiment, vector modulators 300 and 350 are implemented using multiplier and summation techniques. Multiplier techniques may use devices, logic, circuits, hardware, software, processors, filters, any other device suitable for multiplying signals, or any combination of the preceding. Summation techniques may use devices, logic, circuits, hardware, software, processors, filters, combiners, any other device for summing signals, or any combination of the preceding.

Vector modulators 300 and 350 may be operable to function in analog mode or digital mode, in baseband mode or RF mode. Vector modulators 300 and 350, therefore, may be located at any stage of diversity signal combining as described with reference to FIG. 2. According to one example of an embodiment, in baseband mode, vector modulators 300 and 350 adjust baseband signals, in either digital or analog mode, for example, baseband signal 232. According to another example of an embodiment, in RF mode, vector modulators 300 and 350 adjust RF signals, for example, filtered signals 230.

FIG. 3A is a block diagram illustrating one embodiment of a vector modulator 300. In general, vector modulator 300 adjusts channel signals 301 based on signal adjustments 290 to output an adjusted signal 334. Vector modulator 300 includes a phase splitter 302, a multiplier stage 310, a calibration module 312, and a summation stage 320 coupled as shown in FIG. 3A.

According to one embodiment, channel signals 301 comprise two channel signals, each signal having in-phase I and quadrature Q components. Channel signals 301 may comprise any suitable number of signals and signal components where the number of channel signals 301 may be defined by the number of signals received at the antennas 210 of the diversity combining system 200. Channel signals 301 may be referred to as channel signal S1 and channel signal S2.

Phase splitter 302 splits channel signals 301 into split signals 304. Multiplier stage 310 multiplies the split signals 304 according to signal adjustments 290 by, for example, multiplying split signals 304 and signal weights. A signal weight $W_n$ may comprise any suitable factor associated with signal strength, relative phase ratio between channel signals 301, both, or none of the preceding. According to one embodiment, signal weights $W_n$ are defined as the relative ratios $\rho_1$ and $\rho_2$ between channel signals S1 and S2 combined with an implementation of phase rotations as described by Equations (1) through (4):

$$W_1 = \rho_1 \cos(\Phi_1) \tag{1}$$

$$W_2 = \rho_1 \sin(\Phi_1) \tag{2}$$

$$W_3 = \rho_2 \cos(\Phi_2) \tag{3}$$

$$W_4 = \rho_2 \sin(\Phi_2) \tag{4}$$

where $\Phi_1$ and $\Phi_2$ are phase rotations applied to channel signals S1 and S2, respectively, according to signal adjustments 290.

Calibration module 312 calibrates signal adjustments 290. Calibration module 312 comprises a look-up table that operates to correct imperfections of signal adjustments 290. According to the illustrated embodiment, calibration module 312 is implemented with a look-up table comprising possible corrections of in-phase and quadrature components such that non-constant behavior of signal adjustments 290 may be deemphasized. Calibration module 312 may include any suitable look-up table for calibration without departing from the scope of the invention.

Summation stage 320 combines multiplied signals 314 to output an adjusted signal 334. Summation stage 320 may comprise any number of summation stages suitable for combining the multiplied signals 314. According to an example of an embodiment, summation stage 320 comprises two summation stages, a first stage that sums the multiplied signals 314 and a second stage that sums the output of the first stage to yield an adjusted signal 334.

According to the illustrated embodiment, the adjusted signal 334 results from the summation of the multiplied signals 314 as described by Equations (5) and (6)

$$I = W_1 I_{s1} - W_2 Q_{s1} + W_3 I_{s2} - W_4 Q_{s2} \quad (5)$$

$$Q = W_2 I_{s1} - W_1 Q_{s1} + W_4 I_{s2} - W_{34} Q_{s2} \quad (6)$$

According to one embodiment, vector modulator 300 may operate in the RF mode. Phase splitter 302 may replicate the channel signals S1 and S2 to yield split signals $(I_{S1}+Q_{S1})$, $(I_{S1}+Q_{S1})$, $(I_{S2}+Q_{S2})$, and $(I_{S2}+Q'_{S2})$, where signals $(I_{S1}+Q_{S1})$ and $(I_{S2}+Q_{S2})$ may be substantially similar to the channel signals S1 and S2, and where signals $(I_{S1}+Q'_{S1})$ and $(I_{S2}+Q'_{S2})$ are at a 90 degree phase difference. Any phase difference may be used without departing from the scope of the invention. Multipliers at the multiplier stage 310 multiply each of the split signals $(I_{S1}+Q_{S1})$, $(I_{S1}+Q'_{S1})$, $(I_{S2}+Q_{S2})$, and $(I_{S2}+Q'_{S2})$ with the signal weights $W_n$ described by Equations (1) through (4) to yield multiplied signals $W_1(I_{S1}+Q_{S1})$, $W_2(I_{S1}+Q'_{S1})$, $W_3(I_{S2}+Q_{S2})$, $W_4(I_{S2}+Q'_{S2})$. Multiplier stage 310 may comprise two multiplie each of the channel signals S1 and S2. Summation stage 320 combines multiplied signals 314 to output an adjusted signal 334.

According to one embodiment, vector modulator 300 may operate in the baseband mode. Phase splitter 302 is operable to branch the channel signals $I_{S1}$, $Q_{S1}$, $I_{S2}$, and $Q_{S2}$ to yield split signals $I_{S1}$, $I_{S1}$, $Q_{S1}$, $Q_{S1}$, $I_{S2}$, $I_{S2}$, $Q_{S2}$ and $Q_{S2}$. Multipliers at the multiplier stage 310 multiply each of the split signals $I_{S1}$, $I_{S1}$, $Q_{S1}$, $Q_{S1}$, $I_{S2}$, $I_{S2}$, $Q_{S2}$, and $Q_{S2}$ by the signal weights $W_n$ described by Equations (1) through (4) to yield multiplied signals $W_1 I_{S1}$, $W_2 I_{S1}$, $W_1 Q_{S1}$, $W_2 Q_{S1}$, $W_3 I_{S2}$, $W_4 I_{S2}$, $W_3 Q_{S2}$, and $W_4 Q_{S2}$. Multiplier stage 310 may comprise two multipliers for each of the channel signals $I_{S1}$, $Q_{S1}$, $I_{S2}$ and $Q_{S2}$. Any suitable number of multipliers may be used at multiplier stage 310. Summation stage 320 combines multiplied signals 314 to output an adjusted signal 334.

FIG. 3B is a block diagram illustrating one embodiment of a vector modulator 350 having two multiplier stages and two summation stages. In general, vector modulator 350 adjusts channel signals 301 based on signal adjustments 290 to output an adjusted signal 394. Vector modulator 350 results from the modification of vector modulator 300, where the phase rotations $\Phi_1$ and $\Phi_2$ have a relative phase difference $2\Phi$. Vector modulator 350 includes a first multiplier stage 352, a phase splitter 360, a first summation stage 370, a second multiplier stage 380, and a second summation stage 350 coupled as shown in FIG. 3B.

First multiplier stage 352 multiplies the channel signals 301 according to signal adjustments 290. First multiplier stage 352 performs multiplication of channel signals 301 and relative ratios $\rho_1$ and $\rho_2$ received by signal adjustments 290. Phase splitter 360 splits ratio signals 354 into split signals 364. First summation stage 370 combines split signals 364 to form summed signals 374. Second multiplier 380 multiplies summed signals 374 with signal weights $W_n$. According to one embodiment, vector modulator 350 uses signal weights $W_1$ and $W_2$ as defined by Equations (7) and (8):

$$W_1 = \cos(\Phi) \quad (7)$$

$$W_2 = \sin(\Phi) \quad (8)$$

where $\Phi$ is the phase rotation applied to channel signals S1 and S2 according to signal adjustments 290.

Second multiplier stage 380 applies signal weights $W_1$ and $W_2$ to summed signals 374 and second summation stage 390 combines the output of second multiplier stage 380 to form adjusted signal 394 as described by Equations (9) and (10):

$$I = (\rho_1 I_{S1} + \rho_2 I_{S2})\cos(\Phi) + (\rho_2 Q_{S2} - \rho_2 Q_{S1})\sin(\Phi) \quad (9)$$

$$Q = (\rho_1 I_{S1} - \rho_2 I_{S2})\sin(\Phi) + (\rho_2 Q_{S2} + \rho_1 Q_{S1})\cos(\Phi) \quad (10)$$

According to one embodiment, vector modulator 350 may operate in the RF mode. First multiplier stage 352 multiples channel signal S1 by relative ratio $\rho_1$ and channel signal S2 by relative ratio $\rho_2$, resulting in ratio signals $\rho_1 S1$ and $\rho_2 S2$. First multiplier stage 352 may comprise one multiplier for each of the channel signals 301. Phase splitter 360 may replicate the ratio signals 354 to yield split signals $\rho_1(I_{S1}+Q_{S1})$, $\rho_1(I_{S1}+Q'_{S1})$, $\rho_2(I_{S2}+Q_{S2})$, and $\rho_2(I_{S2}+Q'_{S2})$, where signals $\rho_1(I_{S1}+Q'_{S1})$ and $\rho_2(I_{S2}+Q'_{S2})$ are at a 90 degree phase difference with signals $\rho_1(I_{S1}+Q_{S1})$ and $\rho_2(I_{S2}+Q_{S2})$. Any phase difference may be applied to the ratio signals 354 without departing from the scope of the invention. First summation stage 370 sums split signals $\rho_1(I_{S1}+Q_{S1})$, $\rho_1(I_{S1}+Q'_{S1})$, $\rho_2(I_{S2}+Q_{S2})$, and $\rho_2(I_{S2}+Q'_{S2})$ to yield summed signals $\rho_1(I_{S1}+Q_{S1})+\rho_2(I_{S2}+Q_{S2})$ and $\rho_1(I_{S1}+Q_{S1})-\rho_2(I_{S2}+Q_{S2})$. Second multiplier 380 multiplies summed signals 374 with signal weights $W_n$ to form adjusted signal 394.

According to one embodiment, vector modulator 350 may operate in the baseband mode. First multiplier stage 352 multiplies channel signals $I_{S1}$ and $Q_{S1}$ by relative ratio $\rho_1$ and channel signals $I_{S2}$, and $Q_{S2}$ by relative ratio $\rho_2$, resulting in ratio signals $\rho_1 I_{S1}$, $\rho_1 Q_{S1}$, $\rho_2 I_{S2}$ and $\rho_2 Q_{S2}$. Multiplier stage 352 may comprise two multipliers for each of the channel signals $I_{S1}$, $Q_{S1}$, $I_{S2}$, and $Q_{S2}$. Any suitable number of multipliers may be used at the multiplier stage 352. Phase splitter 360 is operable to branch the ratio signals pisi, $\rho_1 Q_{S1}$, $\rho_2 I_{S2}$, and $\rho_2 Q_{S2}$ to yield split signals $\rho_1 I_{S1}$, $\rho_1 Q_{S1}$, $\rho_2 I_{S2}$, and $\rho_2 Q_{S2}$. First summation stage 370 yields summed signal $\rho_1 I_{S1}+\rho_2 I_{S2}$, $\rho_2 Q_{S2}-\rho_1 Q_{S1}$, $\rho_1 I_{S1}-\rho_2 I_{S2}$, $\rho_2 Q_{S2}+\rho_1 Q_{S1}$. Second multiplier 380 multiplies summed signals 374 with signal weights $W_n$ to form adjusted signal 394.

Various modifications, additions, or omissions may be made to vector modulators 300 and 350 without departing from the scope of the invention. For example, any suitable combination of multiplier stages and summation stages of vector modulator 350 may be used to yield adjusted signal 394. Additionally, channel signals 301 may be received from any location of diversity combining system 200. Accordingly, vector modulators 300 and 350 may be placed at any point of the receiving path of diversity combining system 200 without departing from the scope of the invention.

In summary, vector modulators 300 and 350 receive channel signals 301 to adjust them according to signal adjustments 290. Signal weights $W_n$ and relative ratios $\rho_1$ and $\rho_2$ are applied to channel signals 301 to yield adjusted signals 334 and 394 at vector modulators 300 and 350 respectively.

Figure 4:
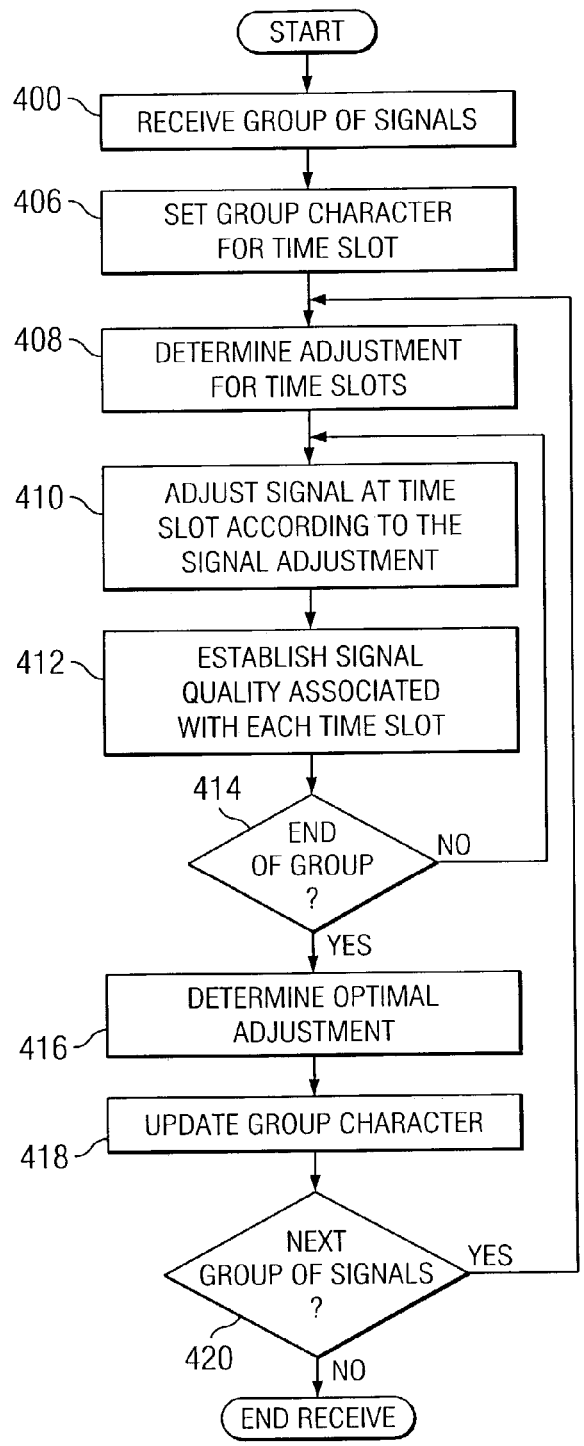
FIG. 4 is a flowchart illustrating a method for adjusting signals in the diversity combining system.

FIG. 4 is a flowchart illustrating an embodiment of a method for adjusting signals in a diversity combining system. In general, different adjustments are performed for each signal of a group of signals at a time slot. The signal quality of the signals is estimated, and adjustments for the next time slot are determined in response to the signal quality estimations.

The method begins at step 400, where incoming signals are received by the vector modulator 250. The incoming signals are grouped into groups upon arrival at the vector modulator 250. The signals of a group are associated with a common group character, which is set at step 406. Each group of incoming signals may comprise the signals received at each antenna 210. For example, in a diversity combining system 200 having two antennas 210a and 210b, the group of incoming signals may have two signals in a group. Each group may be associated with a common group character. According to the illustrated embodiment, the common group character set at step 406 includes signal adjustment information for the group being processed. According to one embodiment, a common group character $A_i$ includes phase and amplitude information common to the group of incoming signals. A group character may be described as $A_i = I_i + Q_i$, where i represents the index for a series of groups i=1, 2, 3 . . . n.

Each signal of each group of incoming signals may be associated with time slots. A group i of incoming signals may be processed according to any suitable number of time slots N. According to one embodiment, a group of incoming signals is processed using two time slots, that is, N=1 and N=2. Each time slot N may be of any duration suitable for processing the incoming signals. According to the illustrated embodiment, a time slot N may be set to substantially the same duration as a power control group of the communication protocol of system 10. For example, a time slot N may have a duration in the range of a symbol to frame duration of a Code Division Multiple Access (CDMA) power control group, such as approximately 1.25 milliseconds. Since this method operates in the time domain, incoming signals may be grouped sequentially into groups with the same number of pre-determined time slots N as the previous group.

The method proceeds to step 408 where signal adjustment for each time slot of each signal within current group is determined, and to step 410 where the signal adjustment for current time slot is applied.

Signal adjustment module 287 determines a signal adjustment for each time slot N. The signal adjustment may comprise a common group character and a time slot character. According to one embodiment, each time slot has a time slot character $B_{i,N}$ that describes signal information for the signals of group i at time slot N. For example time slot character $B_{1,1}$ describes signal information for incoming signals of group 1 at time slot 1, while time slot character $B_{1,2}$ describes signal information for incoming signals of group 1 at time slot 2. The signal information described by time slot character $B_{i,N}$ may include phase and amplitude information for the time slot being processed. The group character $A_i$ combined with the time slot character $B_{i,N}$ may be used to adjust incoming signals of particular time slots. For example, $A_i + B_{i,N}$ is used to adjust a signal of group i at time slot N. Time slot characters $B_{i,N}$ may be selected such that different adjustments are performed at each time slot. According to the illustrated embodiment, at step 408, two time slot characters $B_{1,1}$ and $B_{1,2}$ are determined for one group of signals associated with group character $A_1$.

The incoming signals are adjusted at a time slot at step 410, according to the adjustment determined at steps 406 and step 408. The method proceeds to step 412, where a signal quality associated with each time slot is determined. The signal quality may comprise a signal-to-noise ratio (SNR). For example, adjustment $A_1 + B_{1,1}$ at time slot 1 may yield a signal quality $SNR_{1,1}$, while adjustment $A_1 + B_{1,2}$ at time slot 2 may yield signal quality $SNR_{1,2}$.

The method proceeds to step 414, where signal adjustment module 287 determines if there is a next time slot within the current group at step 414. According to one embodiment, two time slots are used, and the method determines if time slot 2 of the current group is yet to be adjusted. If there is a next time slot to be processed, the method proceeds to step 410 to adjust the signals at the next time slot according to the signal adjustments determined at step 408.

If there is no next time slot to be processed at step 414, the method proceeds to step 416, where signal adjustment module 287 determines an optimal adjustment. The optimal adjustment may be determined for each group according to the signal qualities determined at step 412. For example, $SNR_{1,1}$ and $SNR_{1,2}$ may be compared to determine which signal adjustment is better. An optimal adjustment may be determined using any iteration process, recursion formula, or any other processing method suitable for determining an optimal adjustment. The term "optimal" as used in this document may not necessarily describe the best possible outcome. As used in this document, an "optimal adjustment" may be any relative adjustment that may result in an improved signal quality. In some cases, however, the optimal adjustment may not result in an improved signal quality.

The method proceeds to step 418, where the group character is updated. According to one embodiment, a next group character $A_{i+1}$ is updated to the optimal adjustment $A_i + B_{i,N}$. For example, if adjustment $A_1 + B_{1,2}$ with signal-to-noise ratio $SNR_{1,2}$ is the optimal signal adjustment, next group character $A_2$ may be updated to the optimal adjustment $A_1 + B_{1,2}$. According to one example of an embodiment, a time domain filter may be used when determining the next group character $A_i$.

If there is a next group at step 420, the method proceeds to step 406 to set a group character for the next group. The adjustment may be represented by $A_2 + B_{2,1}$. The time slot character $B_{i,N}$ may the same as for the previous group, that is, $B_{i,N} = B_{i+1,N}$. Other methods for determining an adjustment are described with reference to FIGS. 5 and 6. If there are no next groups at step 420, the receipt of signals is ended. After ending receipt, the method terminates.

In summary, the method illustrated at FIG. 4 processes incoming signals as groups of signals, where each group is associated with any number of time slots N. The incoming signals are adjusted by setting a group character $A_i$ and an individual character $B_{i,N}$ for each time slot. The quality of the adjusted incoming signals is compared to find an optimal adjustment, which is used to adjust subsequent signals.

Steps may be added, omitted, modified, or performed in any suitable order without departing from the scope of the invention. For example, determining adjustment for time slots at step 408 may be modified to be performed iteratively for each time slot. As another example, determining whether there are next time slots to be processed at step 414 may be omitted. As yet another example, determining optimal adjustment at step 416 may be performed substantially simultaneously with updating group character at step 418.

Figure 5:
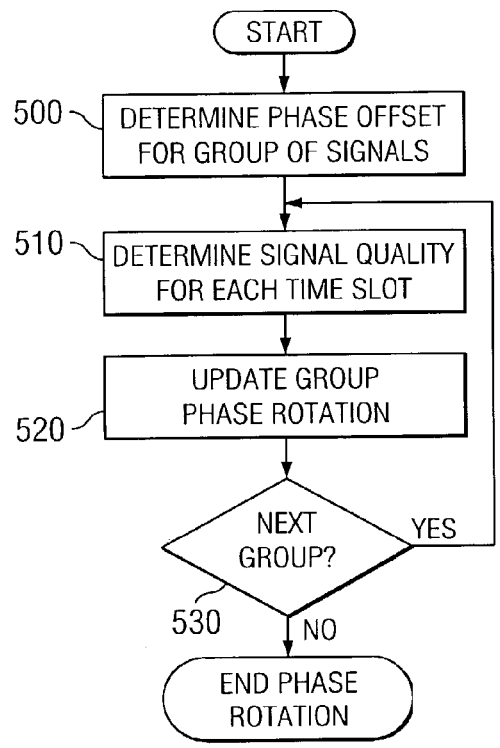
FIG. 5 is a flowchart illustrating a method for adjusting signals according to phase rotation.

FIG. 5 illustrates a method for adjusting signals according to phase rotation. The method begins at step 500, where a phase offset between time slots for a group of signals is determined. The phase offset may be represented by the time slot character. According to one embodiment, a phase offset may be determined from field simulation where the phase offset may be in a range from one degree to 90 degrees. In general, the determination of a phase offset depends on the speed of the mobile. Typically, the higher the speed of mobile device 20 the larger the phase offset, and the lower the speed of the mobile device 20 the smaller the phase offset. For example, 3 degrees may be used for a mobile being displaced at 5 km per hour and 24 degrees may be used for a mobile being displaced at 20 km per hour.

The method proceeds to step 510, where signal quality information associated with each time slot is determined.

After applying the group phase offset to each time slot signal, signal adjustment module 287 may determine a signal quality for each time slot. Signal adjustment module 287 determines which direction to change the group phase determined at step 500 so that the signal quality is improved. According to one embodiment, the determination may be made by comparing which time slot phase causes a better metric M(n). The metric M(n) may describe the signal-to-noise ratio (SNR) estimated by signal quality estimator 283. A normalized difference ρ between two metrics associated with two time slots defined in equation is calculated.

$$\rho = \frac{M(n) - M(n-1)}{M(n)} \qquad (11)$$

The method proceeds to step 520, where the signal adjustment module 287 updates group phase rotation. At this step, signal adjustment module 287 determines the group phase for the next group of signals. If the normalized difference ρ is less than a field variable ε, the group phase remains unchanged. The field variable ε is a predefined positive number determined by field tests. For example, the field variable may be any value within the range of 0.01 to 0.3. If the normalized difference ρ is greater than the field variable ε, the group phase is updated. For example, group phase Φ may be updated as described by Equation (12):

$$\Phi = \Phi + \rho \Delta_1 \qquad (12)$$

where $\Delta_1$ is the step size that group phase advances. For example, the step size may be any value withing the range of 3 to 90 degrees.

The method proceeds to step 530, where a determination is made of whether there is a next group to process. If there is a next group, the method returns to step 510, where the updated group rotation 520 is applied to the next time slots for determining the signal quality for each time slot. If there is no next group to process, the method ends phase rotation.

In summary, the method of FIG. 5 performs a phase search for an optimal group phase that results in better signal quality. Steps may be added, omitted, modified, or performed in any suitable order without departing from the scope of the invention. For example, a step of applying the phase rotation to each time slot may be added between steps 500 and 510. As another example, determining signal quality for each time slot at step 510 may be performed substantially simultaneously with updating group phase rotation.

Figure 6:
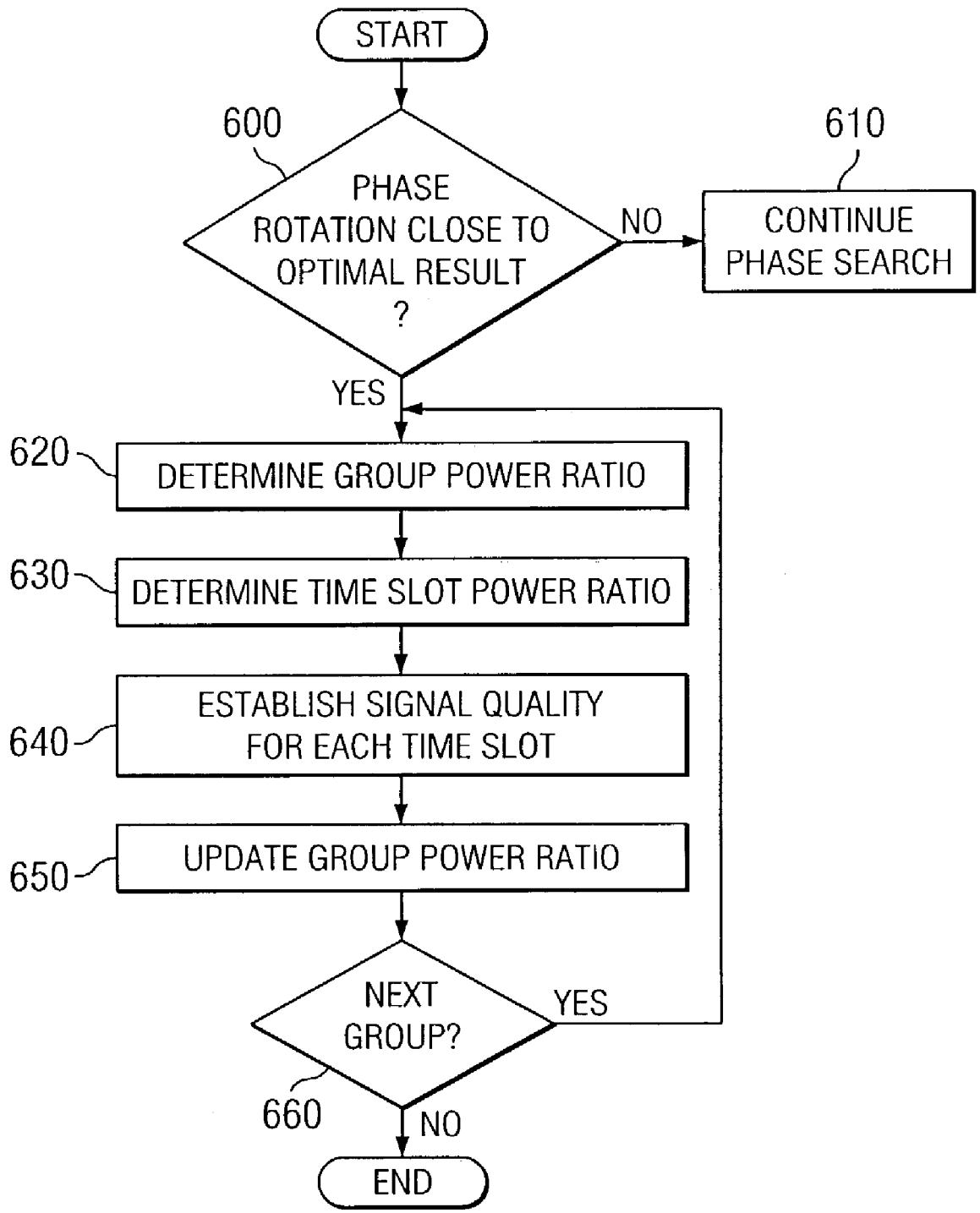
FIG. 6 is a flowchart illustrating a method for adjusting a signal according to a power ratio.

FIG. 6 illustrates an embodiment of a method for adjusting a signal according to a power ratio. This method may be performed in conjunction with the method described with reference to FIG. 5. For example, the method described with reference to FIG. 6 may be performed after group phase is determined to have reached an optimal result. As used in this document, the term "optimal result" might not necessarily be the best result possible. According to the illustrated embodiment, an "optimal result" may be any result corresponding to an improved signal quality for a group of signals. In some cases, however, the optimal result may not correspond to an improved signal quality.

The method begins at step 600, where a determination is made of whether the phase rotation is close to yielding an optimal result. According to the illustrated embodiment, a phase rotation may be considered to be close to yielding an optimal result when the normalized difference ρ from Equation 11 is less than a pre-defined positive number $\epsilon_1$, where the pre-defined positive number $\epsilon_1$ may be any value within the range of 0.01 to 0.2, for example, 0.1. If the phase rotation is not close to the optimal result, the method proceeds to step 610 to continue a phase search. According to the illustrated embodiment, the phase search at step 610 is performed as described with reference to FIG. 5.

If the phase rotation is close to y ielding an optimal result at step 600, the method proceeds to step 620 for determining a group power ratio. The group power ratio may be defined as the relative ratio between the group signal power and the power of the incoming signals.

The method proceeds to step 630 for determining a time slot power ratio. The signal adjustment module 287 determines the relative power ratio for the signal of each time slot. At step 640, where signal quality information associated with each time slot is determined. According to the illustrated embodiment, signal adjustment module 287 receives signal quality information for each time slot from signal quality estimator 283. Signal adjustment module 287 may determine which time slot power ratio results in a better signal quality.

The method proceeds to step 650 where the signal adjustment module 287 updates the group power ratio. At this step, signal adjustment module 287 determines the group power ratio for the next group of signals. According to one embodiment, if the normalized differences ρ as described by Equation 11 is less than the field variable ε, the group power ratio remains unchanged. If normalized difference ρ is greater than the field variable ε, the group power ratio is updated to the combination of relative group power ratio and relative time slot power ratio that yields the better signal quality.

The method proceeds to step 660, where a determination is made of whether there is a next group to process. If there is a next group, the method returns to step 620 for determining the group power ratio and applying the group power ratio updated at step 650. If there is no next group, the method ends.

Steps may be added, omitted, modified, or performed in any suitable order without departing from the scope of the invention. For example, determining if a phase rotation reaches optimal result at step 600 may be modified to determine if the time slot phase reaches an optimal result. As another example, determining group power ratio at step 620 may be performed substantially simultaneously with determining time slot power ratio at step 630.

Certain embodiments of the invention may provide one or more technical advantages. A technical advantage of one embodiment may be that by adjusting the incoming signals in response to signal quality estimates, the signal reception may be improved. The adjustment may be performed by analog or digital signal processing. Another technical advantage of one embodiment may be that adjusting and combining incoming signals reduces the number of signals to be processed, resulting in a reduction of signal processing resources while maintaining diversity gain.

Although an embodiment of the invention and its advantages are described in detail, a person skilled in the art could make various alterations, additions, and omissions without departing from the spirit and scope of the present invention as defined by the appended claims.

What is claimed is:

1. A system for combining signals comprising:
  a plurality of antennas operable to receive a plurality of groups of signals at a mobile device, each group of signals comprising a plurality of signals, each signal having a time slot, at least two of the antennas separated by a distance within a range of 0.1 to 1.0 wavelength;
  an estimator operable to establish a signal quality associated with each time slot of each signal of the groups of signals;

a signal adjustment module operable to repeat the following for each group of signals of the plurality of groups of signals:
  set a current group character associated with a current group of signals;
  set an adjustment associated with a time slot of each signal of the current group of signals, the adjustment comprising an adjustment of a relative phase distribution among the signals or an adjustment of a relative power distribution among the signals;
  adjust each signal of the current group of signals at the time slot in accordance with the adjustment associated with the time slot;
  receive the signal-to-noise ratio associated with each time slot of each signal of the current group of signals;
  determine an optimal adjustment in accordance with the received signal qualities;
  set the adjustment for the next group of signals to the optimal adjustment; and
a vector modulator operable to:
  combine the plurality of signals of each group of signals to form one or more combined signals, the number of the combined signals being less than the number of the plurality of signals of the group of signals received at the plurality of antennas; and
  calibrate the optimal adjustment in accordance with a look-up table entry, the look-up table entry associated with a deemphasis of a non-constant signal characteristic.

* * * * *